(12) United States Patent
Fujii et al.

(10) Patent No.: US 6,666,397 B2
(45) Date of Patent: Dec. 23, 2003

(54) TAPE CASSETTE AND CASSETTE HOLDER

(75) Inventors: Hiroshi Fujii, Tokyo (JP); Shuichi Ota, Saitama (JP)

(73) Assignee: Sony Corporation (JP)

( * ) Notice: Subject to any disclaimer, the term of this patent is extended or adjusted under 35 U.S.C. 154(b) by 41 days.

(21) Appl. No.: 09/870,644

(22) Filed: Jun. 1, 2001

(65) Prior Publication Data

US 2002/0020775 A1 Feb. 21, 2002

(30) Foreign Application Priority Data

Jun. 9, 2000 (JP) ........................... P2000-173425

(51) Int. Cl.[7] ............................................... G11B 23/04
(52) U.S. Cl. ................. 242/347.1; 242/338; 242/338.2; 360/132
(58) Field of Search ............................. 242/347.1, 338, 242/338.4, 338.2; 360/132

(56) References Cited

U.S. PATENT DOCUMENTS

| | | | | |
|---|---|---|---|---|
| 4,834,315 A | * | 5/1989 | Watanabe et al. | 242/345 |
| 6,345,778 B1 | * | 2/2002 | Ota | 242/347.1 |
| 6,437,941 B1 | * | 8/2002 | Ota et al. | 360/132 |
| 6,452,749 B1 | * | 9/2002 | Ota et al. | 360/132 |
| 6,456,462 B1 | * | 9/2002 | Ota et al. | 360/132 |
| 6,496,314 B1 | * | 12/2002 | Ota et al. | 360/132 |
| 6,556,378 B1 | * | 4/2003 | Ota et al. | 360/132 |

* cited by examiner

Primary Examiner—John Q. Nguyen
(74) Attorney, Agent, or Firm—Rader, Fishman & Grauer PLLC; Ronald P. Kananen

(57) ABSTRACT

A tape cassette, in which a mouth portion opened forward, upward, and downward is provided in a front portion of a cassette shell containing tape reels around which a tape-like magnetic recording medium is wound, and part of the tape-like recording medium is positioned so as to cross the front end of the mouth portion, includes a front lid positioned on the front side of part of the tape-like recording medium positioned so as to cross the front end of the mouth portion; a slider movable forward and rearward, the slider being provided on the cassette shell; and a back lid positioned on the rear side of part of the tape-like recording medium positioned so as to cross the front end of the mouth portion, the back lid being separated rearward from the tape-like recording medium along with rearward movement of the slider. The tape cassette is characterized in that the back lid is supported on the slider, and each of the slider and the back lid is made from a good conductor, for example, stainless steel. With this configuration, it is possible to prevent occurrence of tape jamming liable to occur at the time of cassette loading or tape loading performed by insertion of a tape cassette having a front lid and a back lid in a cassette holder.

6 Claims, 18 Drawing Sheets

F I G. 7
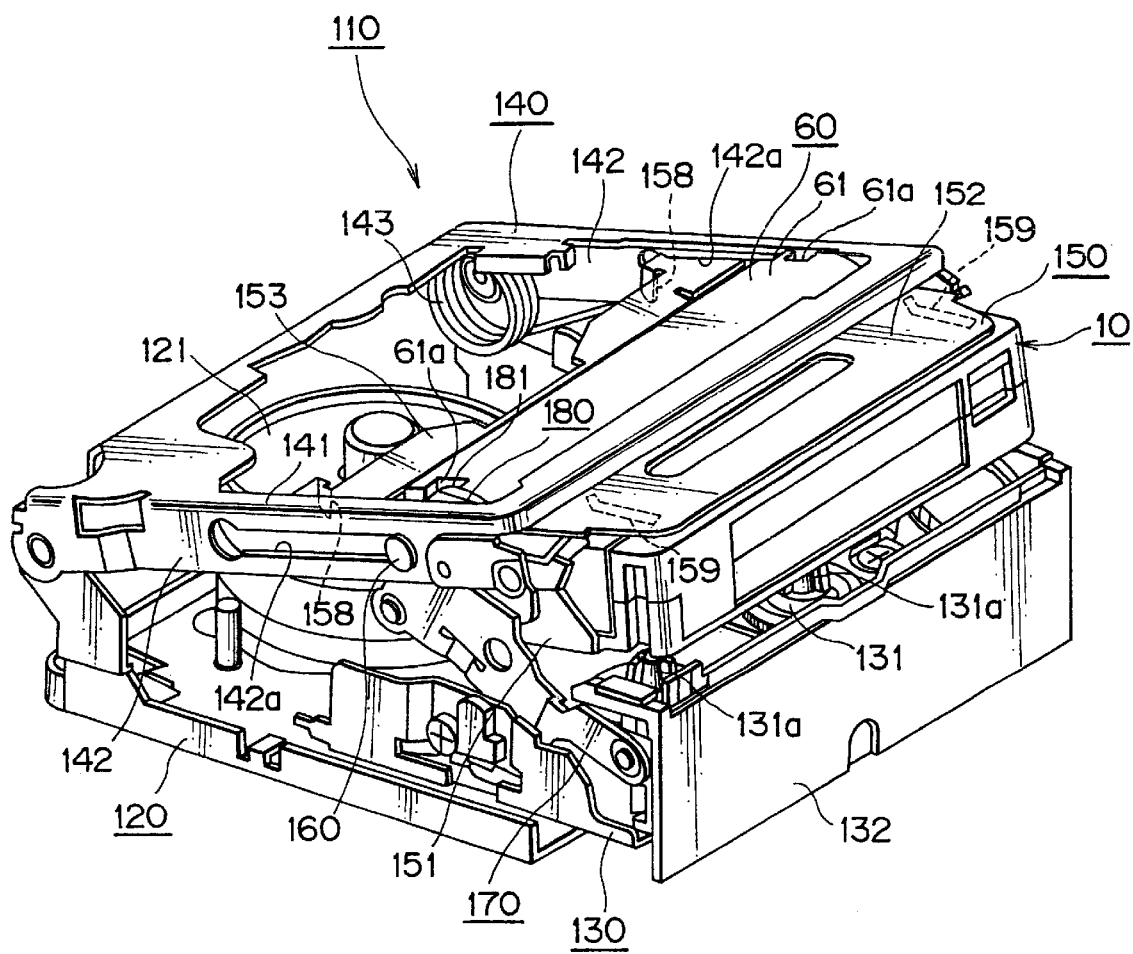

TAPE CASSETTE AND CASSETTE HOLDER

BACKGROUND OF THE INVENTION

The present invention relates to a new tape cassette and a new cassette holder, and particularly to a technique capable of eliminating sticking of a tape-like recording medium on a cassette shell and/or a lid, thereby preventing occurrence of tape jamming at the time of cassette loading or tape loading.

Along with a tendency toward higher recording density, tape cassettes have been required to prevent adhesion of dust on a tape-like recording medium and adhesion of fat on the recording medium due to the contact of operator's fingers therewith, and to meet such a requirement, there has been disclosed techniques in which a portion, exposed from a shell of the tape cassette, of the recording medium is covered with a lid in a non-loading state of the tape cassette in a tape drive apparatus.

According to one of the above techniques, the front side of the recording medium is covered with a front lid and the rear side thereof is covered with a back lid, and at the time of cassette loading, the front lid is turned upward at about 90° to be opened and the back lid is moved nearly obliquely upward by using a cam or the like to be opened, to thereby expose the recording medium.

In such a tape cassette, since the cassette shell has been generally made from a synthetic resin, the front and the back lids have been also made from the synthetic resin.

The above-described related art tape cassette, however, has a problem. In this tape cassette, at the time of lid opening, the front lid is moved upward at about 90° and the back lid is moved nearly obliquely upward by using a cam or the like, to be thus separated from a tape-like recording medium. At this time, if the front lid and/or the back lid are electrically charged, they are opened in a state in which the recording medium is stuck on the front lid and/or the back lid. As a result, the recording medium is loosened to be entangled inside the lid, or even if not entangled, the recording medium is partially drawn by the lid to be excessively extracted from the interior of the cassette shell, to cause an accident such as so-called tape jamming at the time of cassette loading or tape loading.

SUMMARY OF THE INVENTION

An object of the present invention is to provide a tape cassette and a cassette holder, which are capable of preventing occurrence of tape jamming liable to occur at the time of cassette loading or tape loading performed by insertion of a tape cassette having a front lid and a back lid in a cassette holder.

To achieve the above object, according to a first aspect of the present invention, there is provided a tape cassette in which a mouth portion opened forward, upward, and downward is provided in a front portion of a cassette shell containing tape reels around which a tape-like magnetic recording medium is wound, and part of the tape-like recording medium is positioned so as to cross the front end of the mouth portion, the tape cassette including: a front lid positioned on the front side of part of the tape-like recording medium positioned so as to cross the front end of the mouth portion; a slider movable forward and rearward, the slider being provided on the cassette shell; and a back lid positioned on the rear side of part of the tape-like recording medium positioned so as to cross the front end of the mouth portion, the back lid being separated rearward from the tape-like recording medium along with rearward movement of the slider; wherein the back lid is supported on the slider; and each of the slider and the back lid is made from a good conductor.

With this configuration, since the slider and the back lid made from good conductors are supported on the cassette shell made from a synthetic resin, the cassette shell is less electrically charged. As a result, it is possible to prevent the sticking of a tape-like recording medium from being stuck on the front lid and the back lid at the time of opening of these lids, and hence to prevent occurrence of tape jamming liable to occur at the time of cassette loading or tape loading.

The back lid is preferably formed integrally with the slider. With this configuration, it is possible to significantly simplify the structure for supporting the back lid on the slider, and to suppress occurrence of failure and breakage of the back lid.

According to a second aspect of the present invention, there is provided a cassette holder, movably provided on a chassis of a tape drive apparatus, for holding a tape cassette including a cassette shell provided with a slider movable forward and rearward, and loading the tape cassette to a specific loading position of the tape drive apparatus, the cassette holder including: a contact member to be brought into contact with the slider of the tape cassette held by the cassette holder; wherein each of the contact member and the cassette holder is made from a good conductor.

With this configuration, even if the tape cassette is electrically charged, since the contact member being in contact with the tape cassette and the cassette holder are made from good conductors, it is possible to effectively eliminate, that is, effectively ground the electric charges of the tape cassette to the chassis via the contact member and the cassette holder, and hence to prevent the cassette shell, the front lid, and the back lid from being electrically charged. As a result, it is possible to prevent the sticking of a tape-like recording medium from being stuck on the front lid and the back lid at the time of opening of these lids, and hence to prevent occurrence of tape jamming liable to occur at the time of cassette loading or tape loading.

The contact member is preferably a cassette pressing spring for pressing the tape cassette on the chassis at the loading position. With this configuration, it is possible to significantly simplify the structure for supporting the back lid on the slider, and to suppress occurrence of failure and breakage of the back lid.

BRIEF DESCRIPTION OF THE DRAWINGS

FIG. 7 is a schematic perspective view of the tape drive apparatus, showing a state in which the tape cassette is inserted in the cassette holder located at the eject position;

DETAILED DESCRIPTION OF THE PREFERRED EMBODIMENT

Hereinafter, preferred embodiments of a tape cassette and a cassette holder according to the present invention will be described with reference to the accompanying drawings.

Referring to FIGS. 1 to 5, a tape cassette according to the present invention will be first described.

Figure 1:
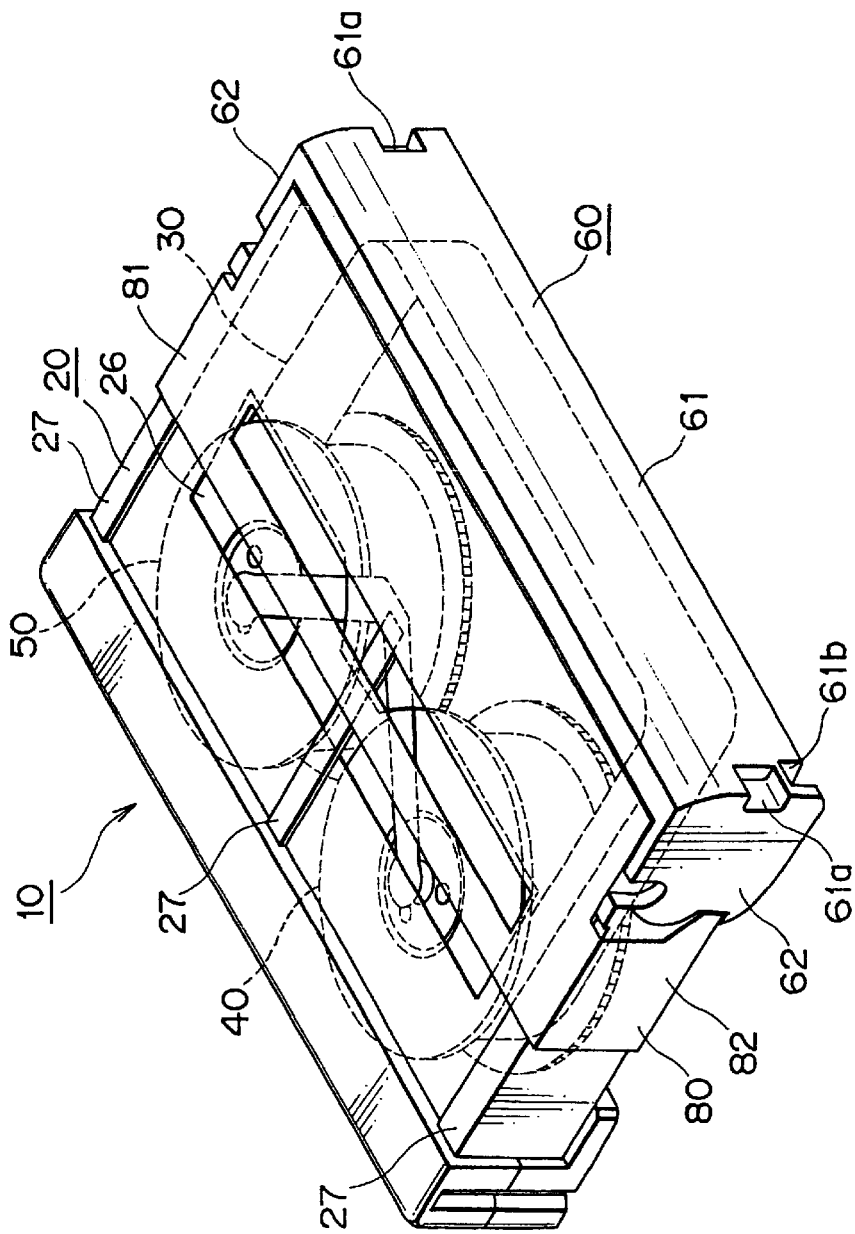
FIG. 1 is a perspective view of an example of a tape cassette used for a tape drive apparatus, which includes a cassette holder of the present invention, showing a state in which lids are located at closed positions.

Referring to FIG. 1, a tape cassette 10 includes a thin-box shaped cassette shell 20 in which tape reels 40 and 50 are rotatably contained. A magnetic tape 30 representative of a tape-like recording medium is wound around the tape reels 40 and 50. The tape cassette 10 also includes a front lid 60 for covering the front surface side of the magnetic tape 30 positioned along the front surface of the cassette shell 20, and a back lid 70 for covering the back surface side of the magnetic tape 30. A slider 80 is supported on the cassette shell 20 in such a manner as to be movable forward and backward. The back lid 70 is formed integrally with the slider 80, and the front lid 60 is turnably supported by the slider 80.

Figure 2:
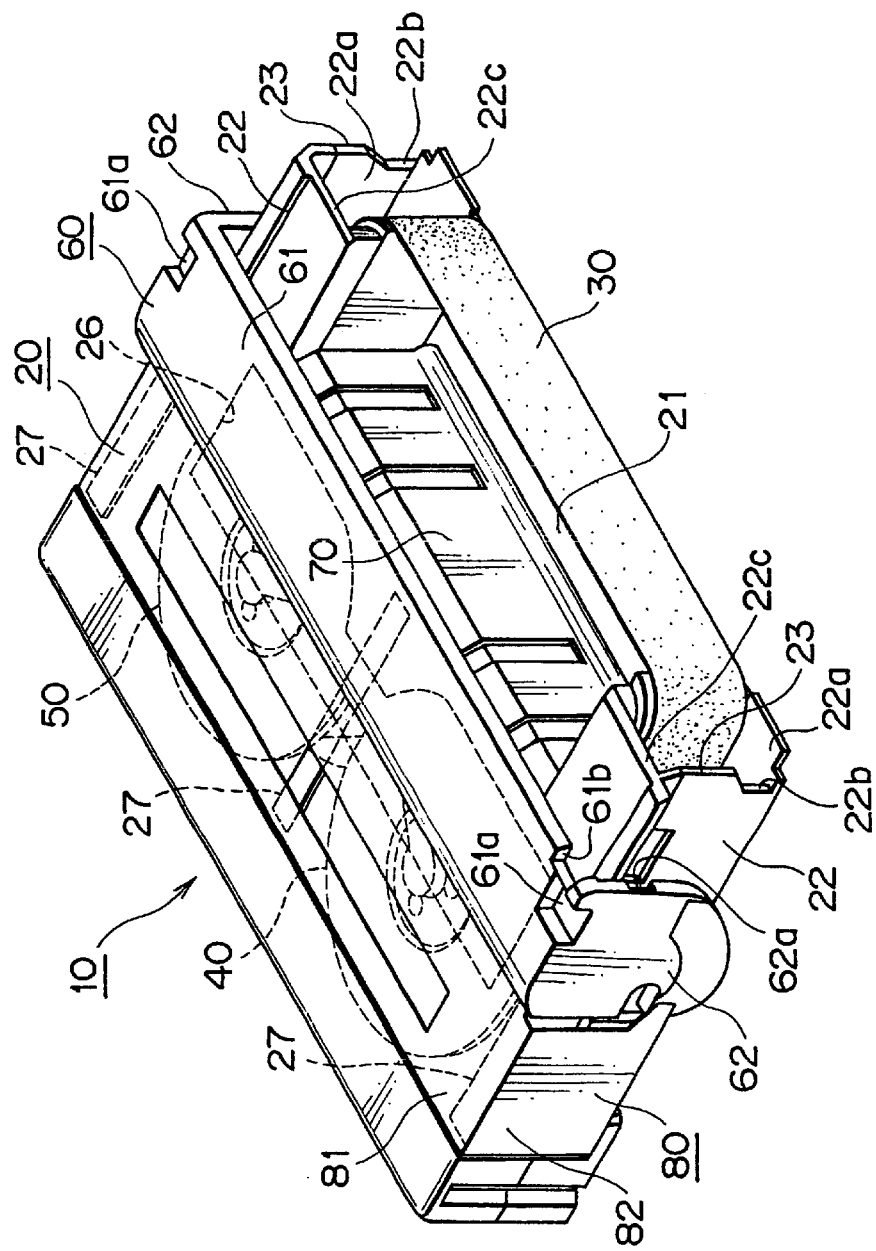
FIG. 2 is a perspective view of the tape cassette, showing a state in which lids are located at opened positions.
Figure 5:
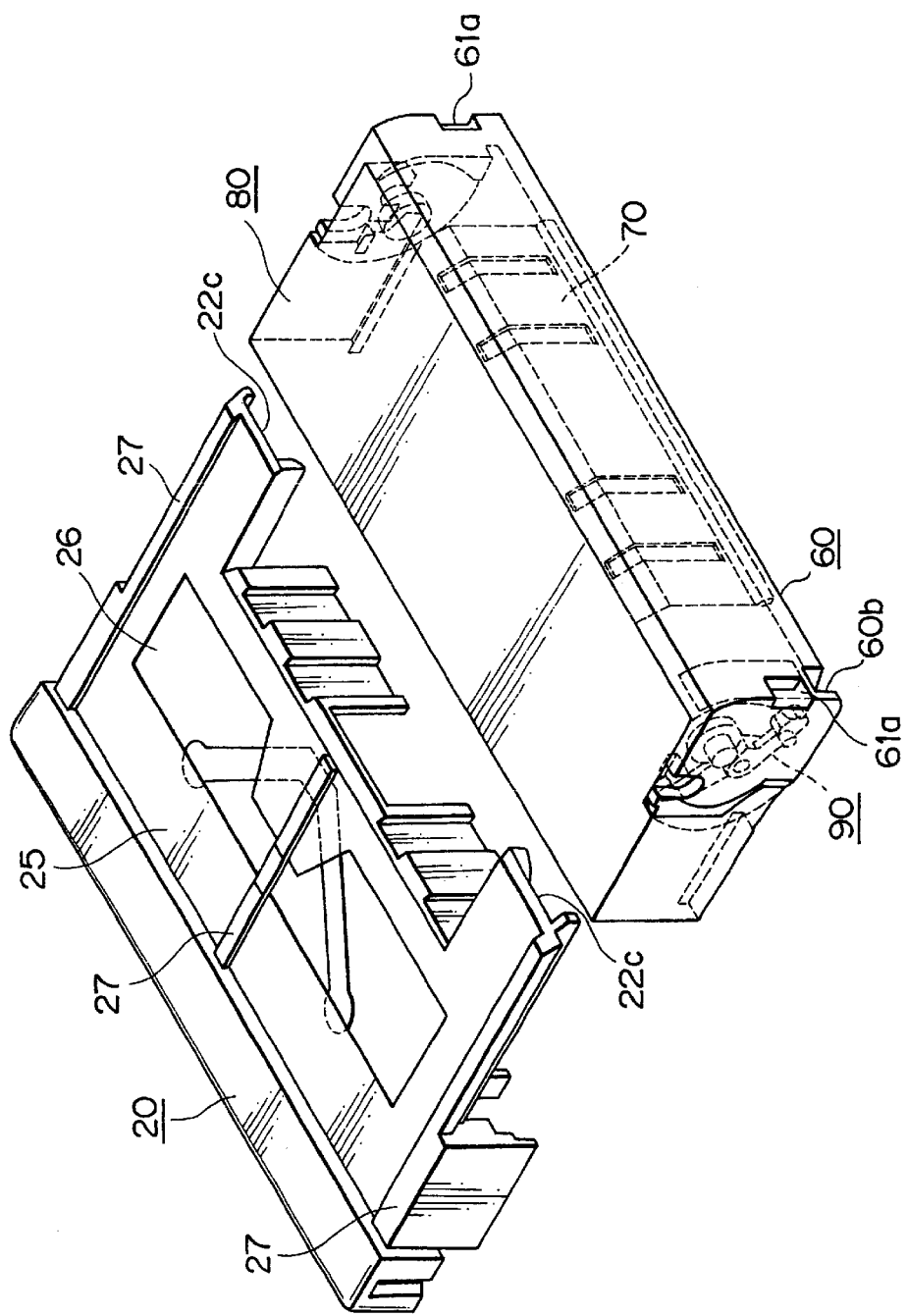
FIG. 5 is a perspective view of an upper side portion of a cassette shell, and the slider unit in a state being separated from the cassette shell.

Referring to FIGS. 2 and 5, the thin-box shaped cassette shell 20 is made from a synthetic resin (plastic). A front portion of the cassette shell 20 has a large recess 21 (hereinafter, referred to as "mouth portion 21"). The mouth portion 21 is opened forward, upward, and downward.

Referring to FIG. 2, a tape extraction portion 22 formed into a lying square cylinder is provided on each of both sides of the mouth portion 21 of the cassette shell 20. A front end 22a of the tape extraction portion 22 is opened. The magnetic tape 30 is extracted outside from the openings 22a of both the tape extraction portions 22, and is stretched between the openings 22a in such a manner as to cross the front surface of the mouth portion 21.

Referring to FIGS. 2 and 5, each tape extraction portion 22 has an outer side front end surface portion 22b. A nearly upper half of the outer side front end surface portion 22b projects forward, to form a cam portion 23. The tape extraction portion 22 also has an upper side front end surface portion 22c taken as a butting portion for positioning, when the tape cassette is inserted in a cassette holder, the tape cassette to the cassette holder in the insertion direction (this will be more fully described later).

When the front lid 60 covers the tape extraction portions 22 and the mouth portion 21, the butting portions 22c are positioned inside the front lid 60. In other words, in the closing state of the front lid 60, the butting portions 22c are not exposed to the outside of the tape cassette. Accordingly, there does not occur an inconvenience that foreign matters adhere on the butting portions 22c or the butting portions 22c are damaged. This makes it possible to always perform accurate positioning of the tape cassette to the cassette holder by the contact of the butting portions 22c with the corresponding members of the cassette holder.

In the case of a tape cassette designed such that the butting portions are exposed, foreign matters may adhere on the butting portions or the butting portions may be deformed by falling. If such a tape cassette is inserted in a cassette holder, the positioning of the tape cassette to the cassette holder in the insertion direction cannot be accurately performed because of inaccurate contact of the butting portions with the corresponding members of the cassette holder, and accordingly, the tape cassette may be often not loaded in a tape drive apparatus. Such a problem has come to be serious along with the tendency to miniaturize tape cassettes and tape drive apparatuses. According to this embodiment, this problem can be solved by the configuration that the butting portions 22c are covered with the front lid 60.

Figure 3:
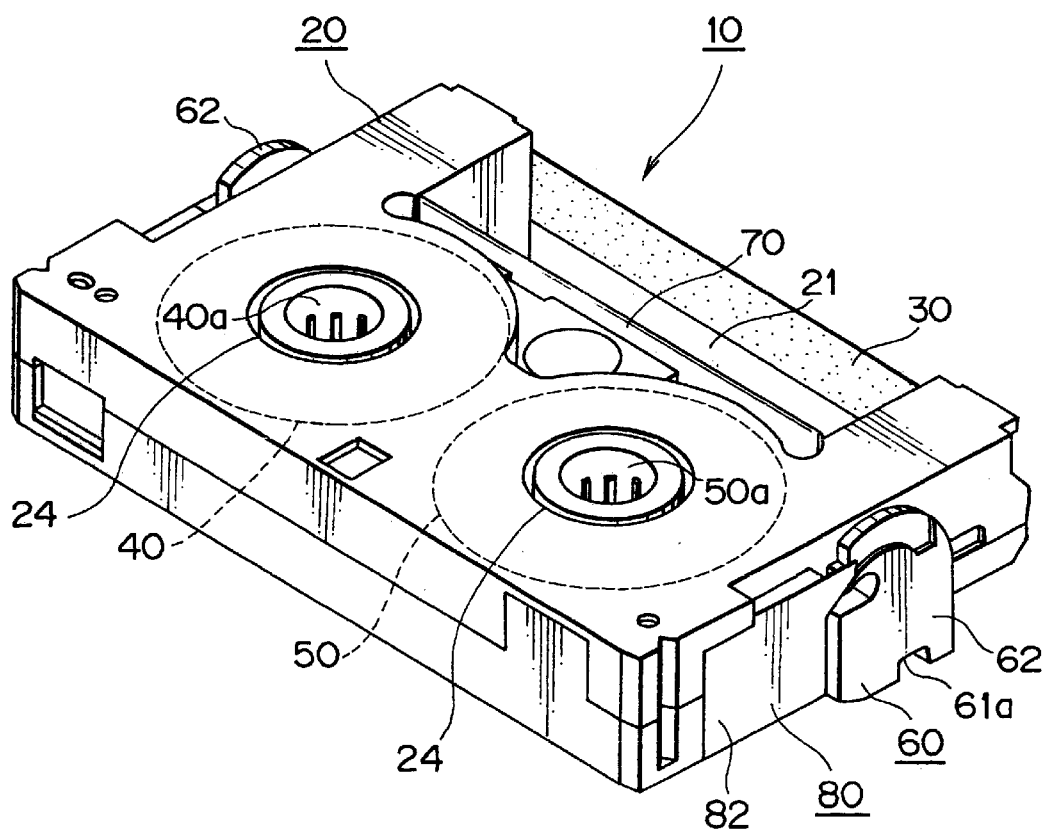
FIG. 3 is a perspective view, seen from below, of the tape cassette, showing a state in which the lids are located at the opened positions.

Referring to FIG. 3, the bottom plate of the cassette shell 20 has two reel base through-holes 24. When the tape cassette 10 is loaded in the tape drive apparatus, two reel bases provided on the tape drive apparatus are inserted in the cassette shell 20 while passing through the reel base through-holes 24, and engagement shafts provided on the reel bases are engaged in reel base engagement holes 40a and 50a opened in the bottom surfaces of the tape reels 40 and 50.

An upper surface portion 25 of the cassette shell 20 (see FIG. 5) has, at a position slightly offset forward from the center in the direction from front to rear, a window 26 longer from side to side (see FIG. 1). The window 26 is adapted to check the winding state of the magnetic tape 30 wound around the tape reels 40 and 50 in the cassette shell 20. In this embodiment, the window 26 is formed of a transparent plastic; however, a window 26 prepared separately may be fitted in the corresponding portion of the cassette shell 20, or a window 26 may be formed integrally with the cassette shell 20 by a so-called two-color molding (see FIG. 5).

Three projecting ribs 27 are formed on right and left side portions and a central portion of the upper surface portion 25 in such a manner as to slightly project upward from the upper surface portion 25. The right and left projecting ribs 27 are apart from the window 26, whereas the central projecting rib 27 crosses the window 26 (see FIG. 5). The slider 80 is slidably moved on the projecting ribs 27.

Additionally, three pieces of the projecting ribs 27 are provided in this embodiment; however, the present invention is not limited. For example, only the right and left projecting ribs 27 may be provided. Further, the cross-sectional shape of the projecting rib 27 may be a square shape or a round shape. That is to say, the projecting rib 27 may be formed into any shape in cross-section insofar as it slightly projects upward from the upper surface portion 25. Further, the projecting rib 27 may be replaced with at least two or more projections spaced from each other at suitable intervals. In summary, the projecting rib 27 or its equivalent may be formed such that the slider 80 slides thereon with a suitable gap kept between the slider 80 and the upper surface portion 25, particularly, the window 26 of the cassette shell 20.

The slider 80 is formed of a plate made from a high conductivity material (good conductor) having a relatively high hardness, for example, a stainless steel plate. In addition, the slider 80 may be subjected to painting for enhancing a designing effect; however, in this case, a portion, to be brought into contact with a cassette pressing spring (which will be described later), of the slider 80 may not be desirable to be subjected to painting for keeping good electric contact therewith.

Figure 4:
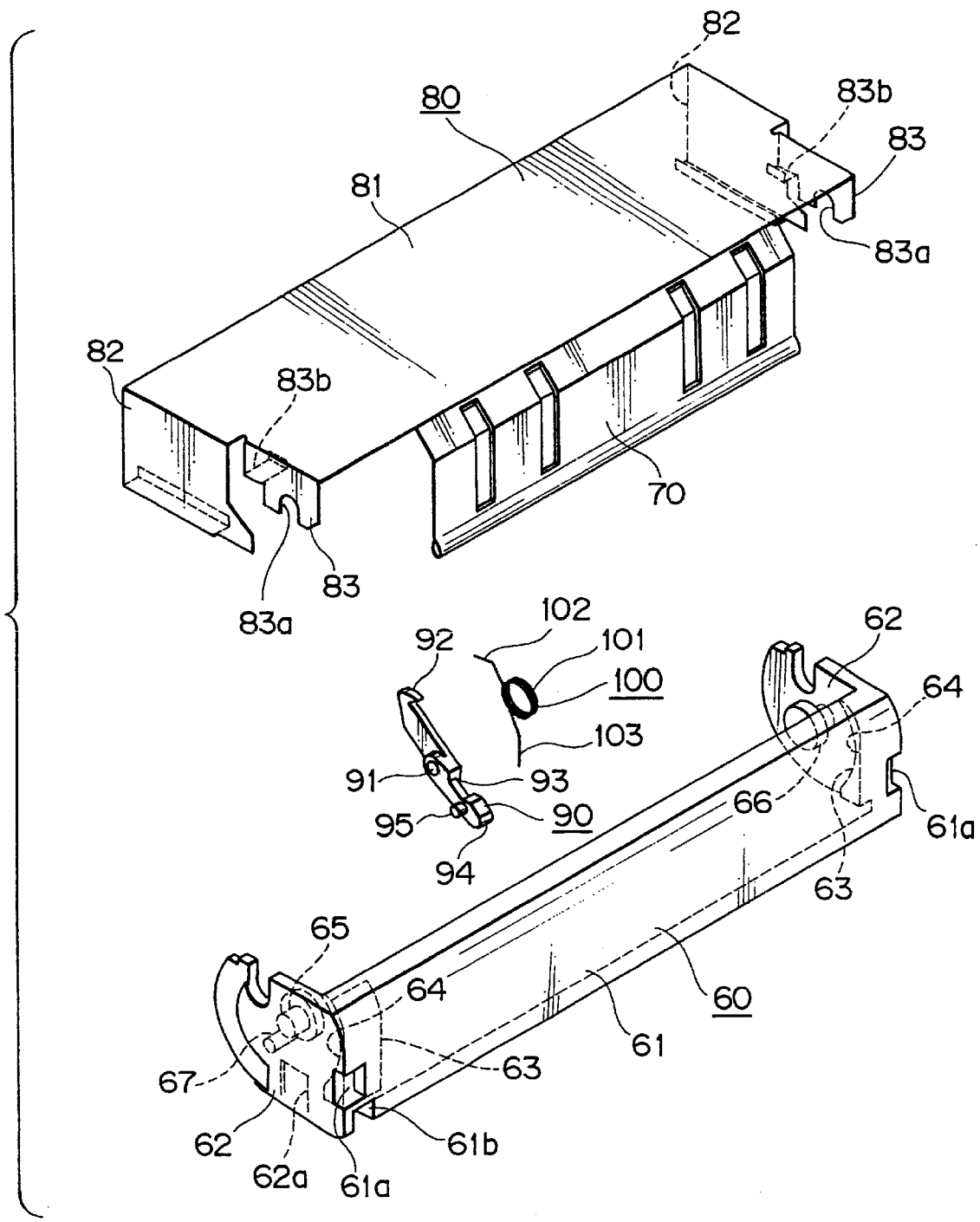
FIG. 4 is an exploded perspective view of a slider unit.

Referring to FIG. 4, the slider 80 is a one-body which has an upper surface portion 81 formed into a plate-shape longer from side to side, and side surface portions formed integrally with the right and left side edges of the upper surface portion 81 in such a manner as to project downward therefrom. Each side surface portion includes a principal surface portion 82 extending from a portion, slightly offset forward from the center in the direction from front to rear, to the rear end, and a lid supporting portion 83 positioned in front of the principal surface portion 82.

The lid supporting portion 83 is positioned slightly inside the principal surface portion 82. The width in the vertical direction of the lid supporting portion 83 is nearly half that of the principal surface portion 82. The lid supporting portion 83 has an approximately semi-circular shaft holding portion 83a opened downward. The back lid 70 is bent from the front edge of the upper surface portion 81 in such a manner as to extend downward therefrom at a right angle (see FIG. 4).

In a state in which both the front lid 60 and the back lid 70 are closed (the state shown in FIG. 1), as described above, the magnetic tape 30 is present in a space formed between both the lids 60 and 70 in such a manner as not to be brought into contact therewith but to be in proximity thereto. Also since the back lid 70 is formed integrally with the slider 80 by the high conductivity stainless steel plate, the back lid 70 is less electrically charged, and therefore, it does not attract the magnetic tape 30 by electrostatic charges. As a result, there does not occur the so-called tape jamming at the time of cassette loading or tape loading. Further, as will be described later, since the slider 80 is pressed down by a cassette pressing spring made from a high conductivity material, electric charges can be effectively grounded from the back lid 70 positioned in the vicinity of the magnetic tape 30 to a main chassis of the tape drive apparatus.

Referring to FIG. 4, the front lid 60 is a one-body which has a front surface portion 61 formed into a stripe-shape longer nearly from side to side, and two side surface portions 62 formed integrally with the right and left edges of the front surface portion 61 in such a manner as to project rearward therefrom. An upper end portion of the front surface portion 61 is gently curved to be displaced rearward as nearing the upper end.

Referring to FIG. 4, a thick wall portion 63 is formed on an inner surface portion, joined to the front surface portion 61, of each side surface portion 62. The thick portion 63 has a restriction surface 64 formed into a circular-arc shape in a side view. Pivots 65 and 66 project from approximately central portions, facing to the restriction surfaces 64, of the inner surfaces of the left and right side surface portions 62. That is to say, the restriction surfaces 64 are formed into the circular-arc-shapes centered at the pivots 65 and 66.

A lower end portion of the inner surface of the left side surface portion 62 has a recess 62a opened downward (see FIG. 4).

A supporting shaft 67 projects from a portion, offset rearward, downward from the pivot 65, of the inner surface of the left side surface portion 62 (see FIG. 4).

A portion, near the lower end, of each of both ends of the front surface portion 61 has an engagement recess 61a opened forward, sideward, and a portion, near the left end, of the lower edge of the front surface portion 61 has a through-cutout 61b (see FIG. 4).

Figure 11:
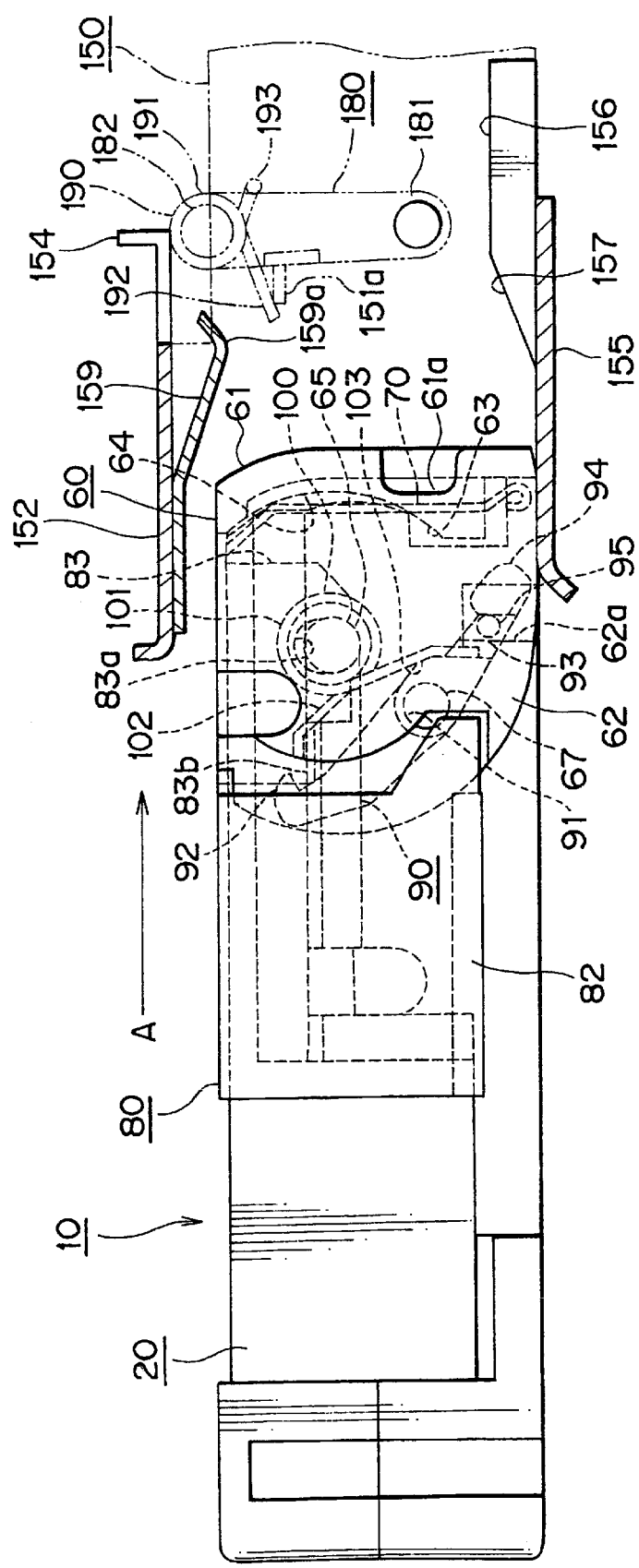
FIG. 11 is a schematic left side view, with parts partially cutaway, illustrating one step of a process of insertion and removal of the tape cassette in and from the tape drive apparatus, in which the tape cassette is started to be inserted in the cassette holder.

The pivots 65 and 66 of the side surface portions 62 of the front lid 60 are turnably engaged in the shaft holding portions 83a of the slider 80, whereby the front lid 60 is turnably supported by the lid supporting portions 83 at the front end portion of the slider 80 (see FIG. 11).

Referring to FIG. 11, a lid lock member 90 is mounted to the inner side of the left side surface portion 62 of the front lid 60. The lid lock member 90 is elongated as a whole, and has at its central portion a supporting hole 91. The supporting shaft 67 formed on the left side surface portion 62 of the front lid 60 is inserted in the supporting hole 91, whereby the lid lock member 90 is turnably supported on the inner surface side of the side surface portion 62.

Referring to FIG. 11, a lock claw 92 is formed on an upper end portion of the lid lock member 90. When the lid lock member 90 is in such a posture as to be tilted rightward, downward as seen from the left side, the lock claw 92 projects nearly forward to lock, from rear, the upper surface of a sliding projection 83b formed on the left lid supporting portion 83 of the slider 80. The lid lock member 90 has a spring catch surface 93. The spring catch surface 93 is formed by cutting out a surface portion which is located on the side opposed to the side facing to the side surface portion 62 at a position between the supporting hole 91 and the lower end of the lid lock member 90. A front portion 94 of the lower end surface of the lid lock member 90 is taken as a circular-arc surface. The lid lock member 90 also has a lock pin 95 projecting from a portion which is located on the left side facing to the left side surface portion 62 of the front lid 60 at a position near the lower end. When the lid lock member 90 is mounted to the inner side of the left side surface portion 62 of the front lid 60, as shown in FIG. 11, the lock pin 95 is positioned in the recess 62a formed in the left side surface portion 62 of the front lid 60.

A torsion coil spring 100 is provided on the lid lock member 90 so as to bias both the front lid 60 and the lid lock member 90 in specific directions (see FIGS. 4 and 11).

The torsion coil spring 100 has a coil portion 101, and two arm pieces 102 and 103. The coil portion 101 is fitted around the pivot 65 formed on the left side surface portion 62 of the front lid 60. The arm piece 102 is brought into elastic contact, from front, with the upper surface of the sliding projection 83b formed on the left lid supporting portion 83 of the slider 80, and the arm piece 103 is brought into elastic contact with the spring catch surface 93 of the lid lock member 90 (see FIG. 11). Accordingly, the lid lock member 90 is biased clockwise as seen from the left side, and the front lid 60 is biased, via the lid lock member 90 and the supporting shaft 67, clockwise as seen from the left side, that is, in the direction in which the front surface portion 61 of the front lid 60 closes the front side of the mouth portion 21 (see FIG. 11).

In this way, the lid lock member 90 locks the opening of the front lid 60, and further, it presses the front lid 60 and the slider 80 by the force of the torsion coil spring 100, to thereby absorb the looseness between the front lid 60 and the slider 80.

Figure 6:
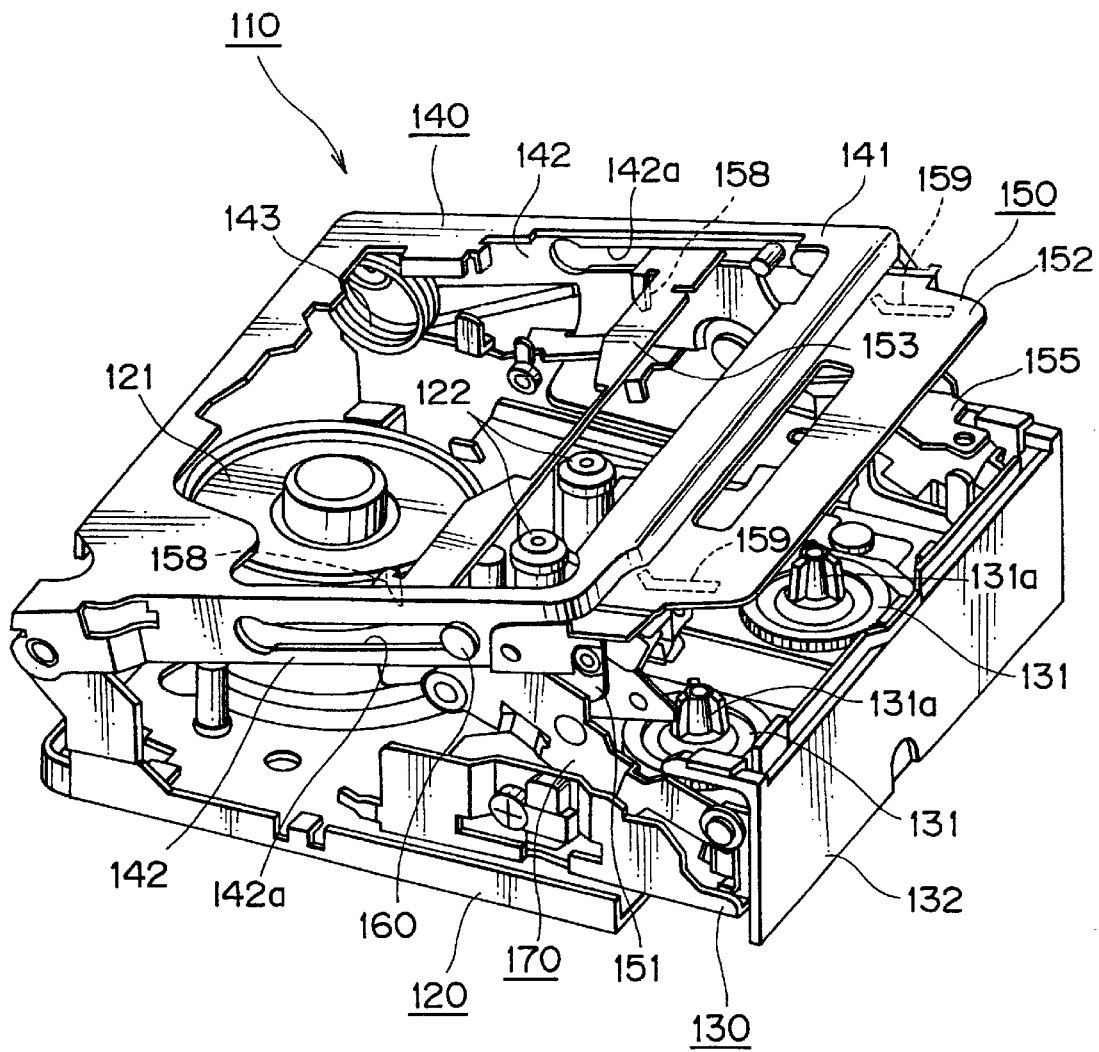
FIG. 6 is a schematic perspective view of a tape drive apparatus including a cassette holder of the present invention, showing a state in which the cassette holder is located at an eject position.
Figure 8:
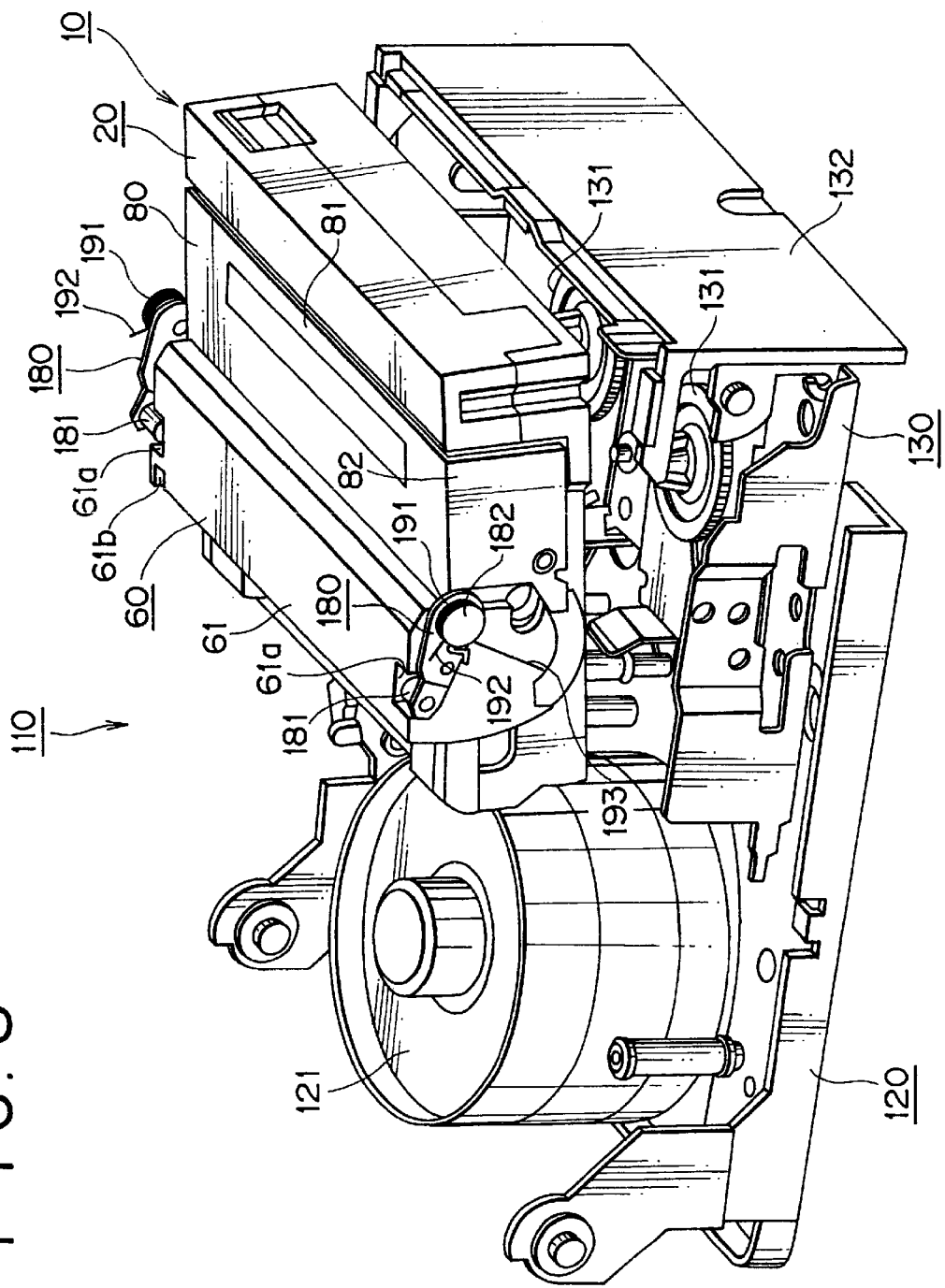
FIG. 8 is a schematic perspective view of the tape drive apparatus, showing the state shown in FIG. 7 with parts partially cutaway.

A tape drive apparatus 110 includes a main chassis 120, a slide chassis 130, a movable frame 140, and a cassette holder 150 (see FIG. 6).

Referring to FIG. 6, the main chassis 120 has principal mechanisms for extracting the magnetic tape 30 from the cassette shell 20, forming a specific tape path, and running the magnetic tape 30, for example, two tape extraction guides 122, a pinch roller (not shown), and the like. As will be described later, the tape extraction guides 122, the pinch roller, and the like are rotatably supported on supporting boards (not shown), and the supporting boards are movably supported on the main chassis 120.

Referring to FIG. 6, the slide chassis 130 is positioned in front of the main chassis 120, and is supported on the main chassis 120 in such a manner as to be movable forward or rearward. The tape cassette 10 is to be loaded in the slide chassis 130. Two reel bases 131 to be engaged with the tape reels 40 and 50 for rotation, and the like are provided on the slide chassis 130.

With respect to the front and rear sides of the tape drive apparatus 110, the inlet side on which the tape cassette 10 is started to be inserted is taken as the front side, and the depth side is taken as the rear side. Accordingly, when the tape cassette 10 is loaded in the tape drive apparatus 110, the front/rear side of the tape cassette has an inverse relationship with the front/rear side of the tape drive apparatus 110. That is to say, when the tape cassette 10 is loaded in the tape drive apparatus 110, the front side of the tape cassette 10 is located on the rear side (depth side) of the tape drive apparatus 110 and the rear side of the tape cassette 10 is located on the front side (inlet side) of the tape drive apparatus 110.

Referring to FIG. 6, the movable frame 140 includes an upper surface portion 141 formed into an approximately square-shape, and side surface plates 142 projecting downward from right and left side edges of the upper surface portion 141. Rear end portions of the side surface portions 142 are turnably supported on a rear end portion of the main chassis 120. The movable frame 140 is biased upwardly by a torsion coil spring 143. Each side surface portion 142 has a guide slit 142a extending from front to rear.

Figure 12:
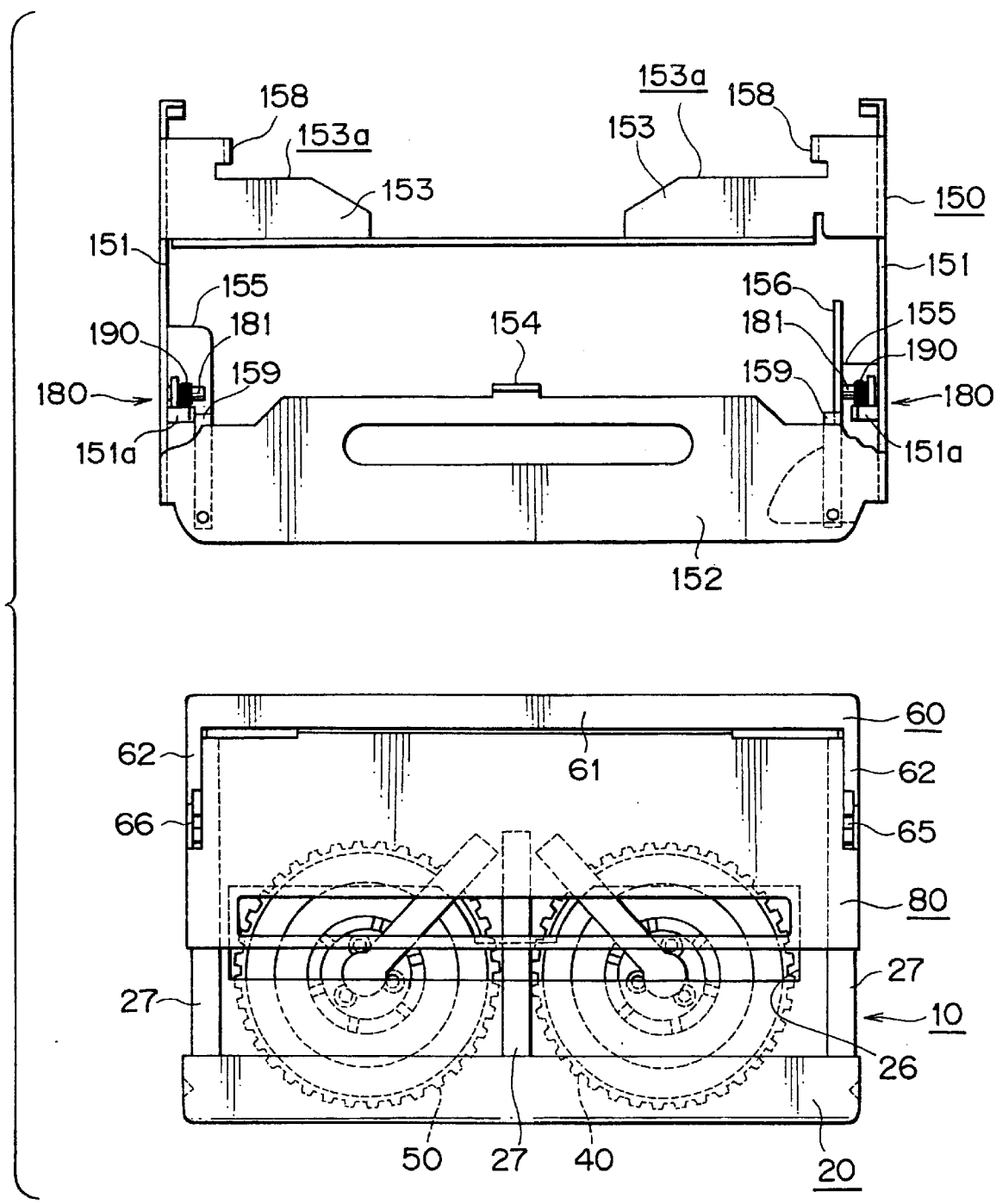
FIG. 12 is a schematic plan view illustrating a state before the tape cassette is inserted in the cassette holder.

Referring to FIGS. 6 and 12, the cassette holder 150 includes two side surface plates 151. Nearly front half portions of the upper ends of the side surface plates 151 are connected to each other by a front side upper surface plate 152, and rear end portions of the side surface plates 151 are connected to each other by a rear end upper surface plate 153. The cassette holder 150 is formed of a plate made from a high conductivity material (good conductor), for example, a steel plate.

Referring to FIG. 12, a lid pressing piece 154 projecting upward is formed at a central portion of the rear edge of the front side upper plate 152. Two receiving plates 155 project inwardly from the lower edges of the side surface plates 151 in such a manner as to come close to each other. These receiving plates 155 extend from an approximately central portion in the direction from front to rear to the front side of the cassette holder 150, and accordingly, the receiving plates 155 are not present at the depth portion (rear end portion) of the cassette holder 150.

A lock releasing cam 156 is formed at the inner edge of the left receiving plate 155 by partially cutting a line which surrounds a portion forming the cam 156, and bending the portion upward. The lock releasing cam 156 is provided at a position corresponding to a position at which a lid opener (which will be described later) is disposed. The edge, on the side on which the tape cassette 10 is inserted, that is, the upper edge of a front end portion of the lock releasing cam 156 is tilted downward as nearing the front end, to form a tilt edge 157 (see FIG. 11). The width in the direction from side to side of the lock releasing cam 156, which is formed by bending a portion of the plate forming the receiving plate 155, that is, the thickness of the plate forming the lock releasing cam 156 is set to be smaller than the width of the through-cutout 61b formed in the front surface portion 61 of the front lid 60.

Referring to FIG. 12, portions, near the right and left ends, of the rear edge of the rear end upper surface plate 153 have two opening portions 153a opened inward and rearward. Two receiving pieces 158 are provided at the inner edges, opposed to each other, of the opening portions 153a. To be more specific, the receiving piece 158 is formed by partially cutting a line which surrounds a portion forming the receiving piece 158 and bending the portion downward. As will be described later, when the tape cassette 10 is inserted in the cassette holder 150, the positioning of the tape cassette 10 in the insertion direction is performed by the contact of the receiving pieces 158 with the butting portions 22c (see FIG. 2) of the tape cassette 10.

Two cassette pressing springs 159 are mounted on the right and left ends of a front end portion of the front side upper surface portion 152 in such a manner as to extend rearward, obliquely downward (see FIGS. 11 and 12). The cassette pressing springs 159 are adapted for pressing downward the tape cassette 10 inserted in the cassette holder 150. Each cassette pressing spring 159 is formed of a plate made from a spring material having a high conductivity. The cassette pressing spring 159 may be left as naked; however, it may be subjected to painting. In this case, a contact portion 159a, to be brought into contact with the slider 80 of the tape cassette 10, of the cassette pressing spring 159 may be desirable not to be subjected to painting for keeping good electric contact therewith.

The cassette pressing springs 159 are located at positions corresponding to those of the projecting ribs 27 formed at the right and left ends of the upper surface portion 25 of the tape cassette 10 inserted in the cassette holder 150 (see FIG. 12).

With this configuration, when the tape cassette 10 is inserted in the cassette holder 150, the cassette pressing springs 159 are slid relative to the slider 80 while being in contact with the upper surface of the slider 80, and accordingly, the cassette pressing springs 159 press the right and left projecting ribs 27 via the slider 80, whereby the gap between the slider 80 and the upper surface portion 25 of the cassette shell 20 can be kept.

Since the slider 80 of the tape cassette 10 is formed of a stainless steel plate having a high conductivity as described above and the cassette pressing springs 159 made from a good conductor is brought into contact with the slider 80, electric charges of the cassette shell 20 can be effectively eliminated, that is, effectively grounded to the main chassis 120 via the cassette holder 150. Accordingly, it is possible to prevent the cassette shell 20, the front lid 60, and the back lid 70 from being electrically charged, and hence to eliminate, at the time of cassette loading or tape loading, the inconvenience that the magnetic tape 30 is stuck on the front lid 60 or the back lid 70 and thereby prevent occurrence of tape jamming.

Figure 16:
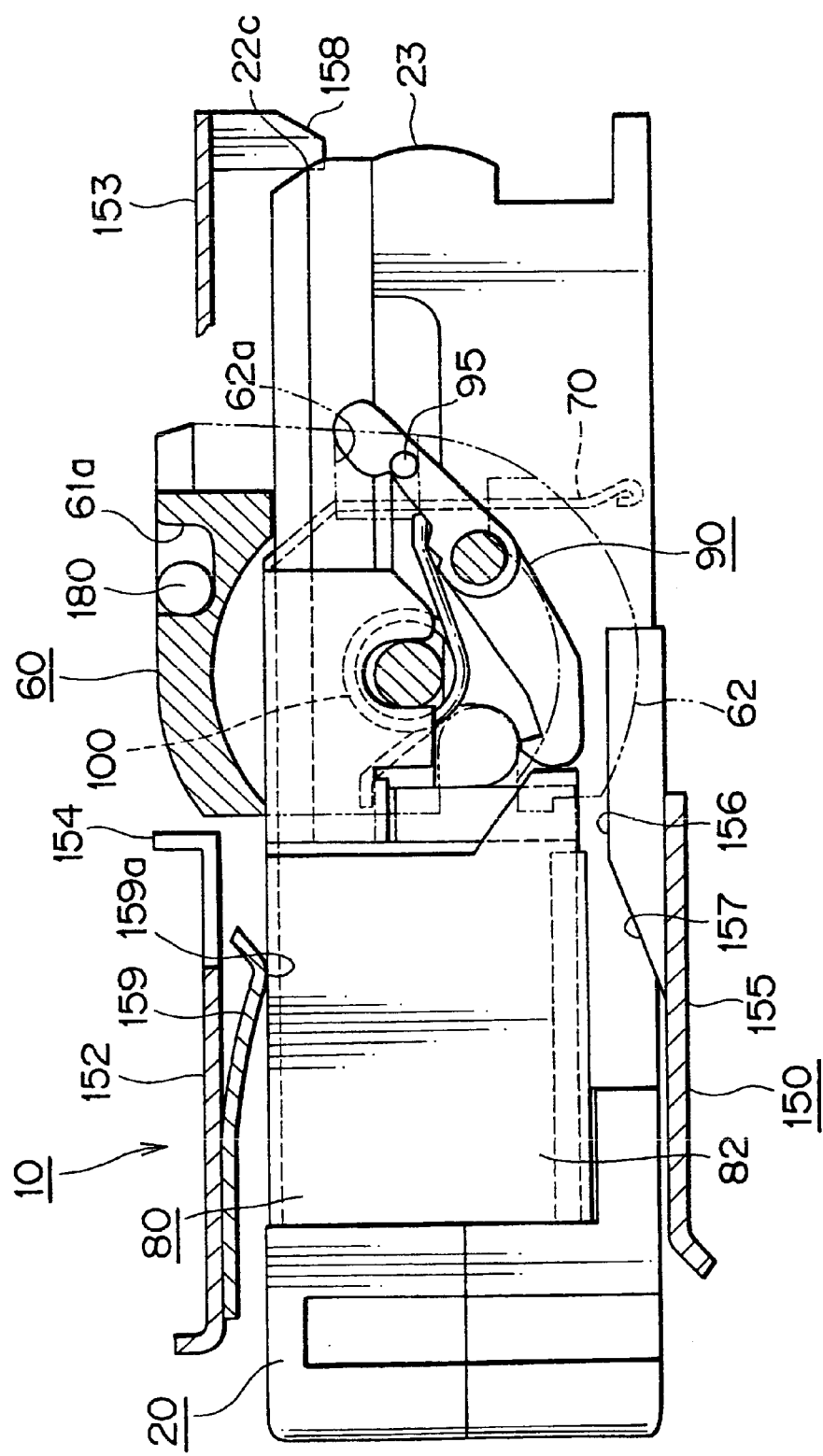
FIG. 16 is a schematic left side view, with parts partially cutaway, illustrating a further step of the process of insertion and removal of the tape cassette in and from the tape drive apparatus, in which the slider is retreated in the state that butting portions come in contact with receiving portions and both the front lid and back lid reach the lid opening positions.

The contact portions 159a, to be brought into contact with the tape cassette 10, of the cassette pressing springs 159, correspond to the receiving plates 155 in the direction from front to rear, that is, in the insertion direction of the tape cassette 10 (see FIG. 12), and accordingly, when the tape cassette 10 is inserted in the cassette holder 150, it is held between the cassette pressing springs 159 and the receiving plates 155 (see FIG. 16). With this configuration, it is possible to stably hold the tape cassette 10 at the depth portion (rear end portion) of the cassette holder 150 without provision of any special holding member.

The cassette holder 150 is supported on the movable frame 140 in such a manner as to be movable forward and rearward. In addition, two sliding pins 160 as part of members for supporting the cassette holder 150 on the movable frame 140 project from the side surface plates 151 of the cassette holder 150. The sliding pins 160 are slidably fitted in the guide slits 142a of the movable frame 140 (see FIG. 6).

Two turning links 170 are provided for connecting the cassette holder 150 to the slide chassis 130. One-ends of the turning links 170 are turnably connected to portions, projecting from the lower edges of the side surface portions 142 of the movable frame 140, of the side surface plates 151 of the cassette holder 150. The other ends of the turning links 170 are turnably supported by a front surface plate 132 mounted on a front end portion of the slide chassis 130.

Two lid openers 180 as means for moving the front lid 60 and the back lid 70 to lid opening positions are provided on the cassette holder 150.

Referring to FIG. 11, each of the lid openers 180 is formed into a long arm shape. An upper end portion of the lid opener 180 is turnably supported on an upper end portion of the inner surface of each side surface portion 151 of the cassette holder 150. An engagement projection 181 projects from the inner surface of a turning end portion of the lid opener 180. A torsion coil spring 190 having a coil portion 191 and arms 192 and 193 is provided on each lid opener 180. The coil portion 191 is fitted around a turning shaft 182 of the lid opener 180. The arm 192 is brought into contact, from above, with a spring catch piece 151a formed on each side surface portion 151 of the cassette holder 150. To be more specific, the arm 192 is formed by partially cutting a line which surrounds a portion forming the arm 192, and raising the portion inward. The arm 193 is brought into contact with a portion, near a turning fulcrum, of the front edge of the lid opener 180. As a result, each lid opener 180 is biased by the torsion coil spring 190 clockwise as seen from the left side in FIG. 11. Since the arm 192 located near the upper end of the lid opener 180 is in contact with the spring catch piece 151a, the lid opener 180 is held in an upright posture in which the turning end is located at the lower end.

The loading of the tape cassette 10 in the tape drive apparatus 110 will be described below.

First, in a state in which the slide chassis 130 is located at an extraction position, the movable frame 140 is turned upward to move the cassette holder 150 to an eject position shown in FIG. 6. In such a state, the tape cassette 10 is in inserted into the cassette holder 150 in the direction A with the front lid 60 side directed forward. Along with the insertion of the tape cassette 10, the lock releasing cam 156 is relatively inserted in the front lid 60 through the through-cutout 61b formed in the front side surface 61 of the front lid 60 (see FIG. 11).

At the same time, the cassette pressing springs 159 are, in the cassette holder 150, relatively pressed by the front end, that is, the front lid 60 of the tape cassette 10 to be deflected upward, to ride on the upper surface portion 25 of the cassette shell 20, whereby the cassette pressing springs 159 press the tape cassette 10 downward. The tape cassette 10 is thus held between the cassette pressing springs 159 and the receiving plates 155.

In this case, since the contact portions 159a of the cassette pressing springs 159 are in contact with the slider 80 of the tape cassette 10, it is possible to ground electric charges of the tape cassette 10 to the main chassis 120 via the cassette holder 150, the movable frame 140, and the slide chassis 130, and hence to prevent the tape cassette 10 from being electrically charged.

The engagement projections 181 of the lid openers 180 are engaged in the engagement recesses 61a of the front lid 60. Further, the circular-arc surface 94 at the lower end of the lid lock member 90 slides up on the tilt edge 157 of the lock releasing cam 156, whereby the lid lock member 90 is turned counterclockwise in FIG. 13, to release the engagement of the lock claw 92 with the sliding projection 83b of the slider 80. As a result, the locking of the front lid 60 at the closing position is released (see FIG. 13).

Figure 13:
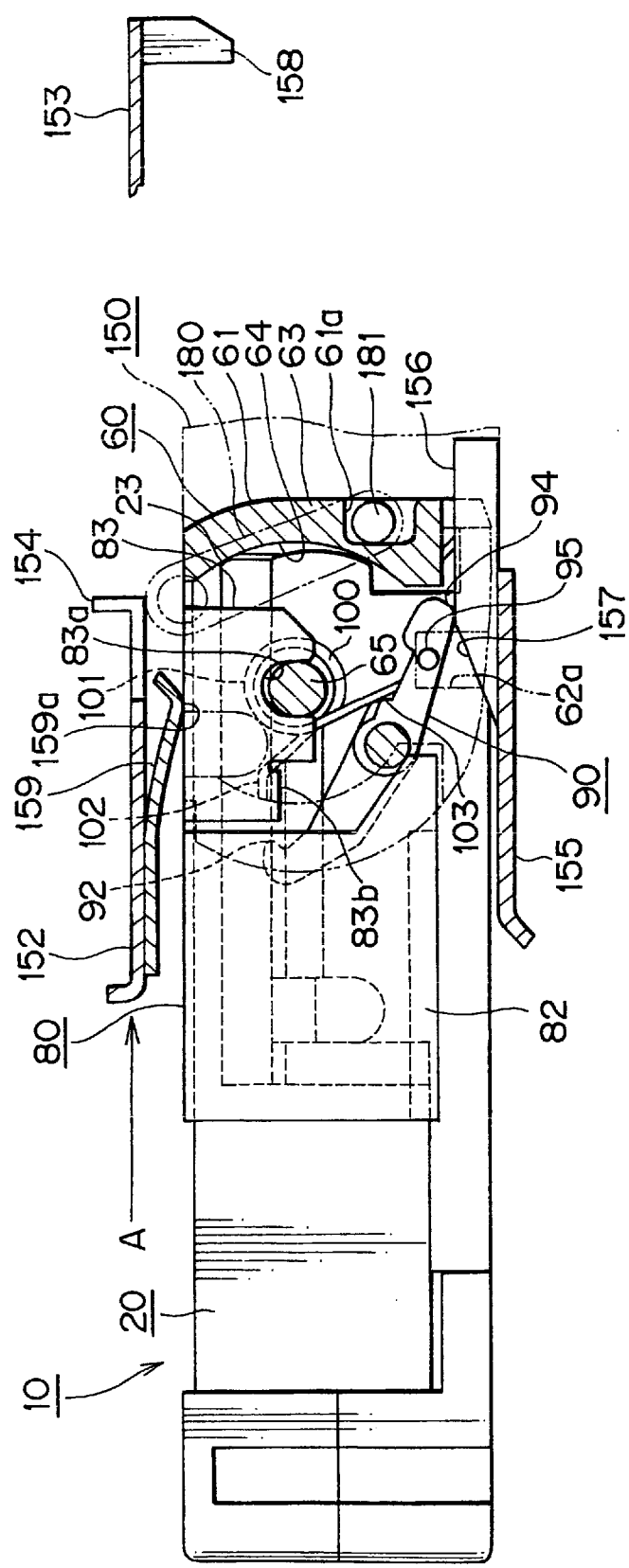
FIG. 13 is a schematic left side view, with parts partially cutaway, illustrating another step of the process of insertion and removal of the tape cassette in and from the tape drive apparatus, in which the locking of the front lid by a lid lock member is released.

As the tape cassette 10 is further inserted in the cassette holder 150, that is, further moved in the direction A in FIG. 13, the engagement projections 181 provided at the turning ends of the lid openers 180 are pressed in the direction A, with a result that the lid openers 180 are turned counterclockwise, that is, in the direction B in FIG. 13. Since the engagement projections 181 of the lid openers 180 are engaged in the engagement recesses 61a of the front lid 60, the front lid 60 is turned counterclockwise, that is, in the direction B along with the upward movement of the engagement projections 181 of the lid openers 180 (see FIG. 14).

Figure 14:
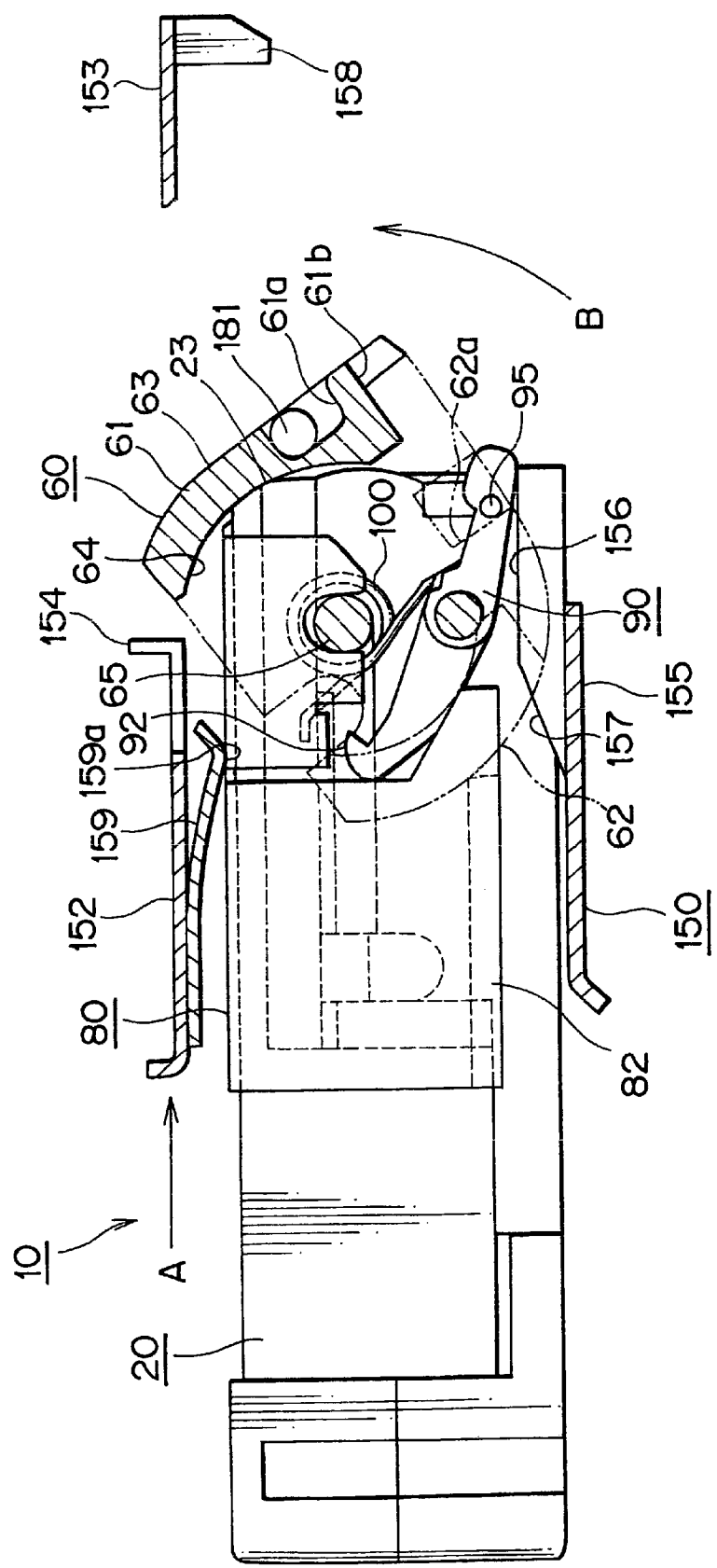
FIG. 14 is a schematic left side view, with parts partially cutaway, illustrating a state subsequent to the state shown in FIG. 13.

In addition, the slider 80 receives, via the front lid 60, a force for moving the slider 80 rearward relative to the cassette shell 20 by the engagement projections 181 of the lid openers 180; however, since the restriction surfaces 64 of the front lid 60 are in contact with the cam portions 23 of the cassette shell 20, the slider 80 cannot be moved rearward relative to the cassette shell 20 and thereby only the front lid 60 is turned upward (see FIGS. 13 and 14).

In each of the states shown in FIGS. 13 and 14, the lock pin 95 of the lid lock member 90 is in contact with the rear side inner side surface of the recess 62a formed in the left side surface portion 62 of the front lid 60, and as the front lid 60 is further turned from such a state in the direction B, the lock pin 95 is drawn in the direction B by the rear side inner side surface of the recess 62a, whereby the lid lock member 90 is also turned in the direction B.

When the front lid 60 is turned, from the initial state (lid opening state shown in FIG. 11), at about 90° in the direction B, the engagement between the restriction surfaces 64 of the front lid 60 and the cam portions 23 of the cassette shell 20 is released (see FIG. 15), whereby the slider 80 becomes movable rearward relative to the cassette shell 20. Further, in the state shown in FIG. 15, the lid pressing piece 154 formed on the front side upper surface plate 152 of the cassette holder 150 is close, from rear, to the upper end of the front surface portion 61 of the front lid 60.

Figure 15:
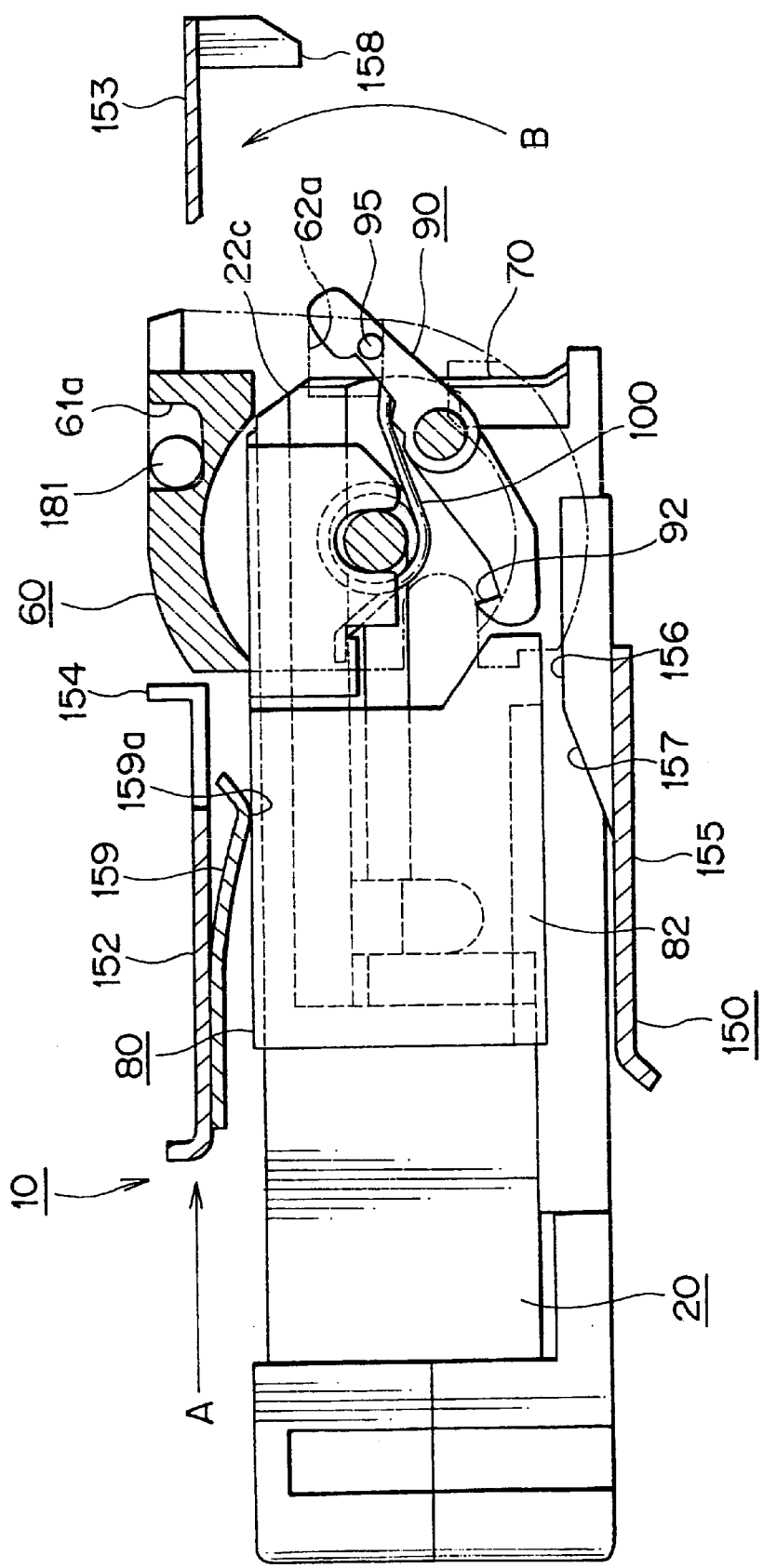
FIG. 15 is a schematic left side view, with parts partially cutaway, illustrating a further step of the process of insertion and removal of the tape cassette in and from the tape drive apparatus, in which the front lid reaches the lid opening position.

As the tape cassette 10 is further moved, from the state shown in FIG. 15, to the depth of the cassette holder 150, that is, in the direction A, since the engagement projections 181 of the lid openers 180 are engaged in the engagement recesses 61a of the front lid 60, the front lid 60 and the slider 80 on which the front lid 60 is supported cannot be moved in the direction A to be left as they are, with a result that the slider 80 is moved, together with the front lid 60, rearward relative to the cassette shell 20 (see FIG. 16). At this time, the back lid 70 is of course moved rearward relative to the cassette shell 20.

The slider 80 is moved (slid) rearward on the projecting ribs 27 formed on the upper surface 25 of the cassette shell 20 in such a manner that a suitable gap is kept between the lower surface of the slider 80 and the window 26 formed on the upper surface portion 25 of the cassette shell 20. As a result, the window 26 is prevented from being damaged due to rubbing by the slider 80 when the slider 80 is moved forward and rearward.

Since the contact portions 159a of the cassette pressing springs 159 press the portions corresponding to the right and left projecting ribs 27 of the cassette shell 20, the slider 80 is not deformed. As a result, it is possible to stabilize the sliding motion of the slider 80 on the cassette shell 20.

When the insertion of the tape cassette 10 in the cassette holder 150 is ended (see FIG. 16), the tape cassette 10 is pressed to the receiving plates 155 of the cassette holder 150 by the cassette pressing springs 159.

At this time, the butting portions 22c of the cassette shell 20, which has been exposed on the front side of the front lid 60 in the lid opening state of the front lid 60, are butted against the receiving pieces 158 of the cassette holder 150, whereby the insertion of the tape cassette 10 in the cassette holder 150 is ended with the positioning of the tape cassette 10 to the cassette holder 150 in the insertion direction attained (see FIG. 16).

In addition, since the front lid 60 is brought into elastic contact with the upper surface of the cassette shell 20, the elastic force of the torsion coil spring 190 does not act to float the cassette shell 20 from the cassette holder 150. That is to say, the elastic force of the torsion coil spring 190 only acts to bring the front lid 60 into elastic contact with the upper surface of the cassette shell 20 (see FIG. 16).

Figure 9:
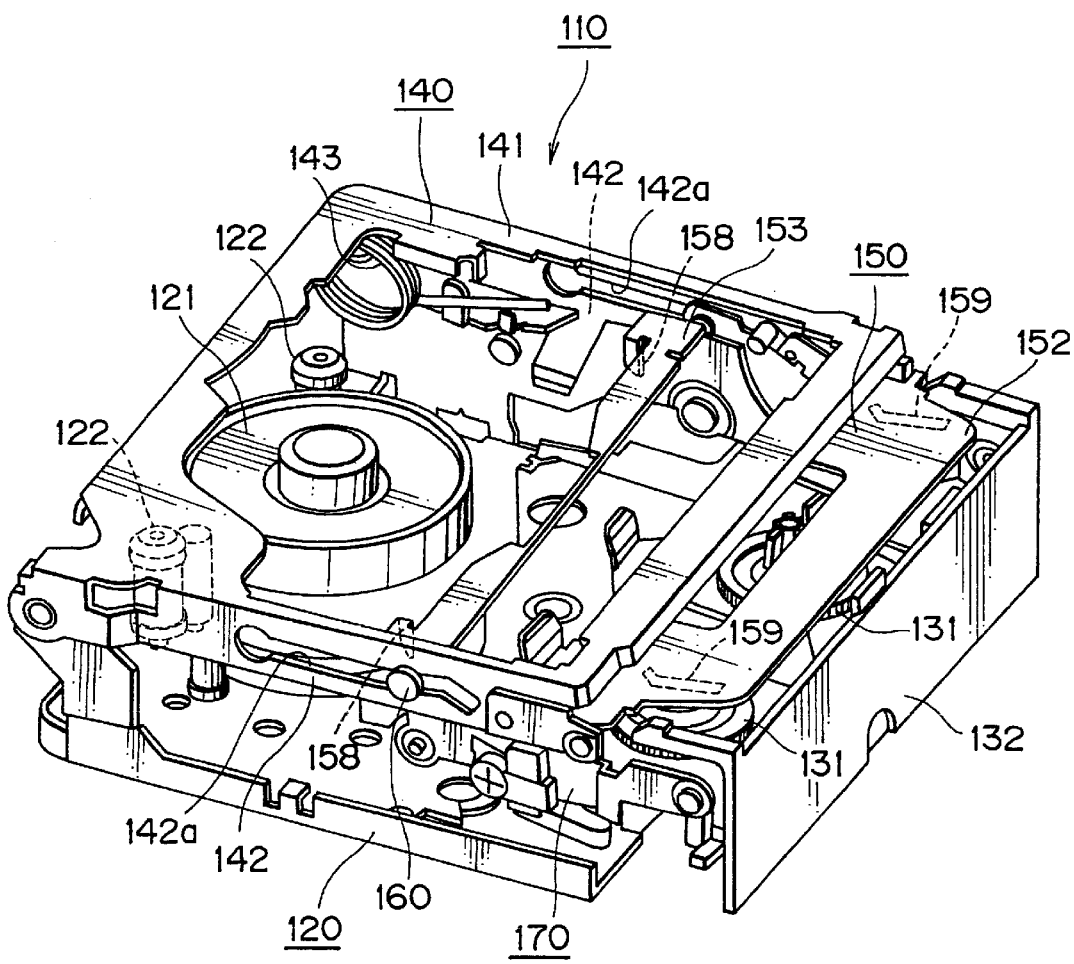
FIG. 9 is a schematic perspective view of the tape drive apparatus, showing a state in which the cassette holder is moved downward and a slide chassis is located at an extraction position.

After the tape cassette 10 is inserted in the cassette holder 150 up to the insertion end position, the movable frame 140 is turned downward, and the cassette holder 150 is moved downward along with the downward turning of the movable frame 140. When the cassette holder 150 is moved downward to the lower limit of a downward movement range (see FIG. 9), the reel bases 131 provided on the slide chassis 130 are inserted in the cassette shell 20 through the reel base through-holes 24, and reel engagement shafts 131a of the reel bases 131 are engaged in the reel base engagement holes 40a and 50a of the tape reels 40 and 50. The tape cassette 10 is then pressed to the slide chassis 130 by the cassette pressing springs 159, and is positioned to the slide chassis 130 by means of a positioning pin (not shown).

The tape extraction guides 122, the pinch roller (not shown), and the like provided on the main chassis 120 are located in the mouth portion 21.

These tape extraction guides 122, the pinch roller, and the like provided on the main chassis 120 are separately supported by supporting boards (not shown), and the supporting boards are movably disposed on the main chassis 120. The degree of freedom in design of these mechanisms can be increased because the receiving plates 155 of the cassette holder 150 do not extend to the depth end portion (rear end portion) of the cassette holder 150. Further, since at the depth end portion of the cassette holder 150, the receiving plates 155 are not present and only at least two plate members, that is, the main chassis 120 and the supporting boards are overlapped to each other, with a result that it is possible to reduce the overall thickness of the tape drive apparatus 110.

Figure 10:
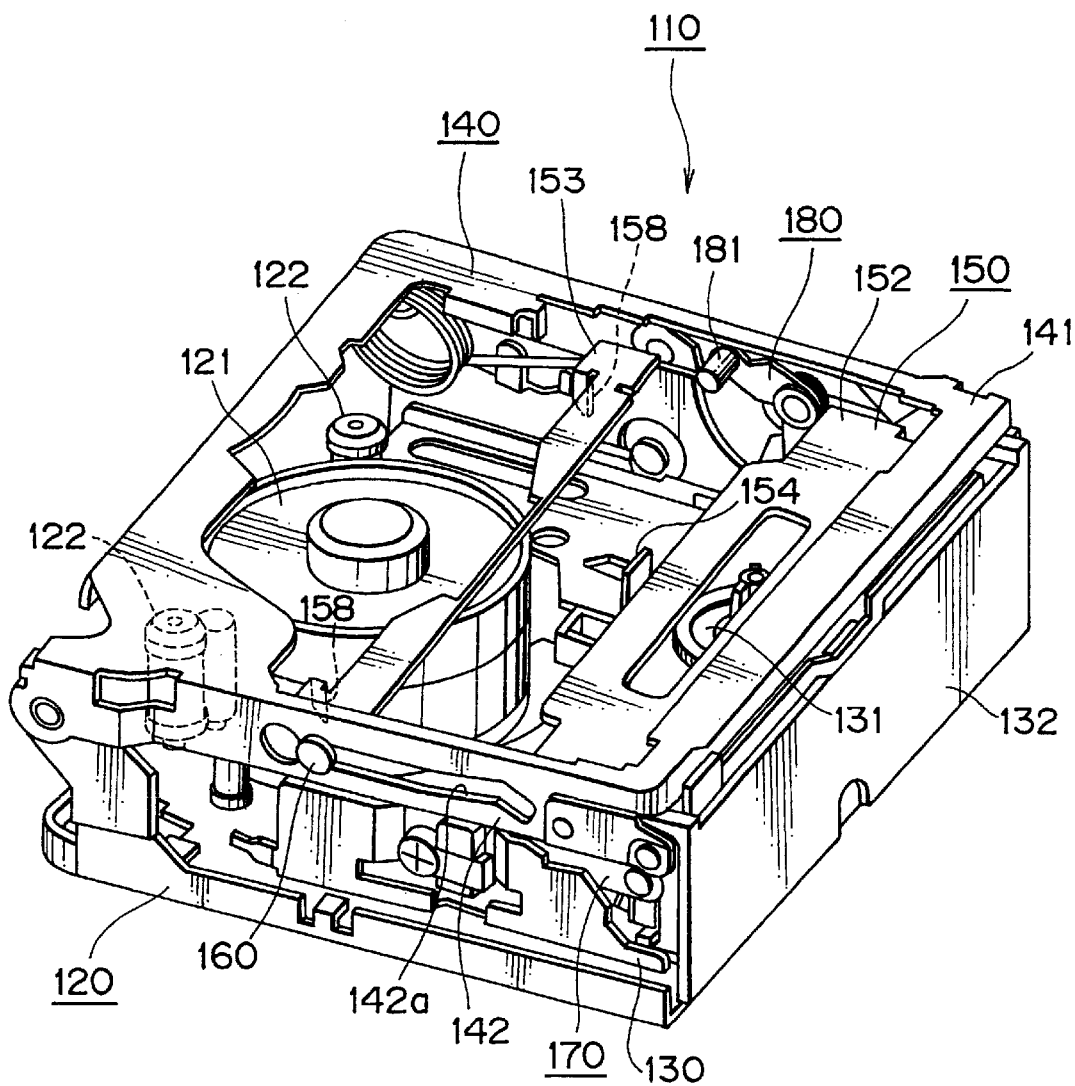
FIG. 10 is a schematic perspective view of the tape drive apparatus, showing a state in which the slide chassis is drawn to a recording/reproducing position.

The slide chassis 130 is then moved to the depth of the main chassis 120, to reach a specific extraction position (see FIG. 10).

After the slide chassis 130 reaches the specific extraction position, the tape extraction guides 122, the pinch roller, and the like are moved to specific positions, to extract the magnetic tape 30 from the cassette shell 20, wind the magnetic tape 30 around a rotary head drum 121 at a specific winding angle, and form a specific tape path.

After the recording or reproducing on or from the magnetic tape 30 is ended, the tape extraction guides 122, the pinch roller, and the like are moved in the mouth portion 21, and an excessive portion of the magnetic tape 30 is wound around one tape reel 40.

After that, the slide chassis 130 is returned up to the above-described extraction position, and the movable frame 140 is turned upward to locate the cassette holder 150 at the eject position (see FIG. 7).

Figure 17:
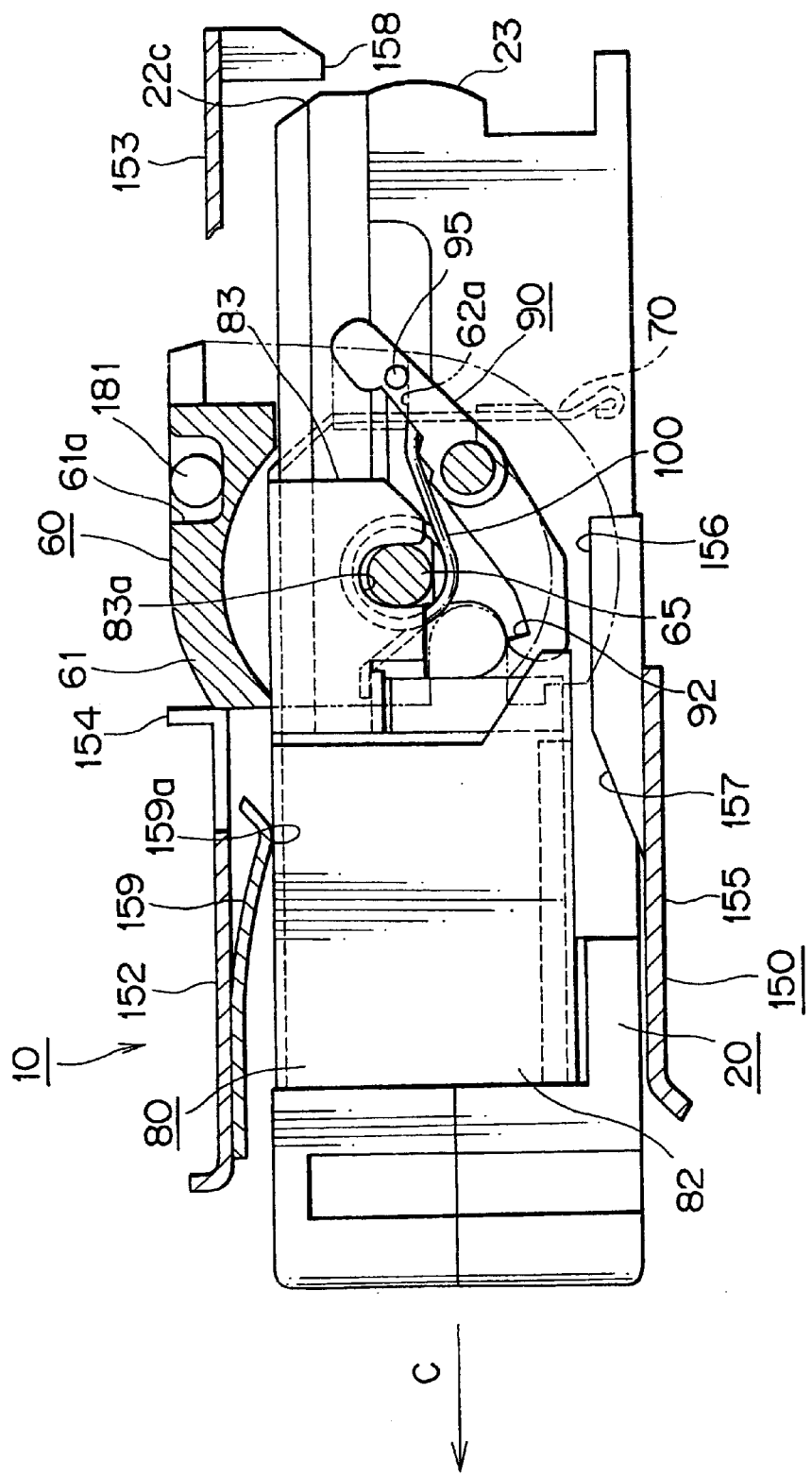
FIG. 17 is a schematic left side view, with parts partially cutaway, illustrating a further step of the process of insertion and removal of the tape cassette in and from the tape drive apparatus, in which the tape cassette is started to be drawn from the cassette holder.

In this state, a portion, projecting from the front end of the cassette holder 150, of the tape cassette 10 can be pulled out of the cassette holder 150 by an operator. The tape cassette 10 is thus moved in the eject direction, that is, the direction C (see FIG. 17).

When the tape cassette 10 is moved in the direction C, the lid pressing piece 154 provided at the central portion of the front side upper surface plate 152 of the cassette holder 150 relatively presses a central portion of an upper end portion of the front surface portion 61 of the front lid 60 in the direction reversed to the direction C, whereby the front lid 60 and the slider 80 (with which the back lid 70 is integrated) are moved to the front end of the cassette shell 20. At this time, since the central portion of the upper end of the front surface portion 61 of the front lid 60, a movement force is given with a good balance kept on the right and left sides.

Figure 18:
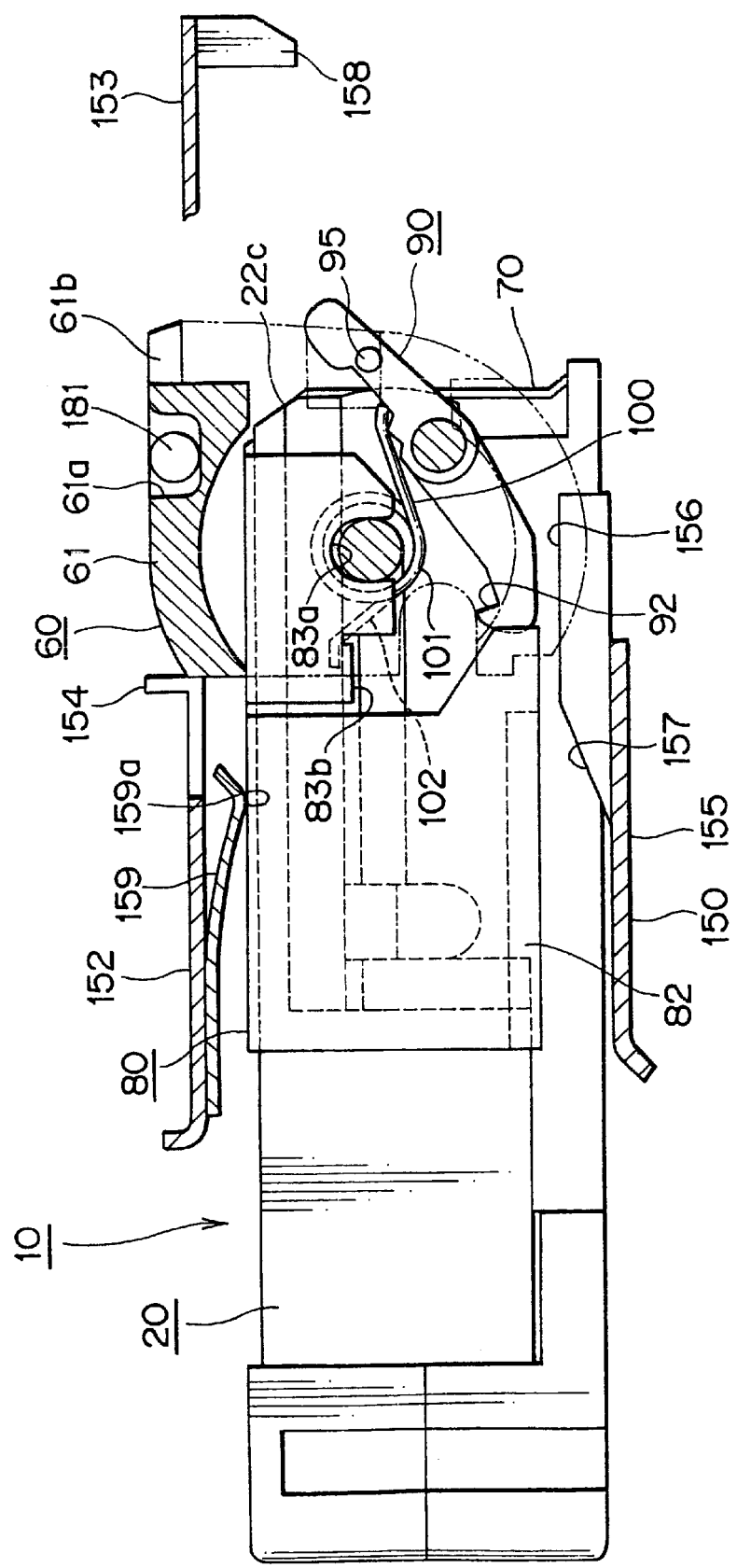
FIG. 18 is a schematic left side view, with parts partially cutaway, illustrating a further step of the process of insertion and removal of the tape cassette in and from the tape drive apparatus, in which the slider reaches the front limit of the movement range.

When the slider 80 reaches the front limit of the movement range (see FIG. 18), since the lower end portions of the thick portions 63 of the front lid 60 are removed from the upper surface of the cassette shell 20, the front lid 60 becomes turnable downward. The front lid 60 is turned downward by the biasing force of the torsion coil spring 100 applied thereto via the lid lock member 90, to reach the lid closing position, thereby covering the magnetic tape 30 in cooperation with the back lid 70 being moved forward. The lock claw 92 of the lid lock member 90 then locks the upper surface of the sliding projection 83*b* of the slider 80. After that, the tape cassette 10 is removed from the cassette holder 150.

In the above-described embodiment, the back lid 70 is integrated with the slider 80; however, the present invention is not limited thereto but may be configured such that the back lid 70 be separately prepared and then attached to the slider 80. Further, stainless steel is exemplified as a material having a high conductivity in the above-described embodiment; however, a synthetic resin in which a metal powder is mixed may be used as a good conductor.

In addition, the material for forming the cassette holder of the present invention is not limited to steel insofar as it exhibits a high conductivity.

While the preferred embodiment of the present invention has been described using specific terms, such description is for illustrative purposes only, and it is to be understood that changes and variations may be made without departing from the spirit or scope of the following claims.

What is claimed is:

1. A tape cassette in which a mouth portion opened forward, upward, and downward is provided in a front portion of a cassette shell containing tape reels around which a tape-like magnetic recording medium is wound, and part of said tape-like recording medium is positioned so as to cross a front end of said mouth portion, said tape cassette comprising:
    a front lid positioned on a front side of part of said tape-like recording medium positioned so as to cross the front end of said mouth portion;
    a slider movable forward and rearward, said slider being provided on said cassette shell; and
    a back lid positioned on the rear side of part of said tape-like recording medium positioned so as to cross the front end of said mouth portion, said back lid being separated rearward from said tape-like recording medium along with rearward movement of said slider;
    wherein said back lid is supported on said slider; and
    each of said slider and said back lid is made from a good electrical conductor.

2. A tape cassette according to claim 1, wherein said back lid is formed integrally with said slider.

3. In combination, a tape cassette in which a mouth portion opened forward, upward, and downward is provided in a front portion of a cassette shell containing tape reels around which a tape-like magnetic recording medium is wound, and part of said tape-like recording medium is positioned so as to cross a front end of said mouth portion, said tape cassette comprising:
    a front lid positioned on a front side of part of said tape-like recording medium positioned so as to cross the front end of said mouth portion;
    a slider movable forward and rearward, said slider being provided on said cassette shell; and
    a back lid positioned on the rear side of part of said tape-like recording medium positioned so as to cross the front end of said mouth portion, said back lid being separated rearward from said tape-like recording medium along with rearward movement of said slider;
    wherein said back lid is supported on said slider; and each of said slider and said back lid is made from a good electrical conductor; and
    a cassette holder, movably provided on a chassis of a tape drive apparatus, for holding said tape cassette including said cassette shell provided with said slider movable forward and rearward, and loading said tape cassette to a specific loading position of said tape drive apparatus, said cassette holder comprising:
        a contact member to be brought into contact with said slider of said tape cassette held by said cassette holder;
        wherein each of said contact member and said cassette holder is made from a good electrical conductor.

4. The combination set forth in claim 3, wherein said back lid is formed integrally with said slider.

5. The combination set forth in claim 3, wherein said contact member is a cassette pressing spring for pressing said tape cassette on said chassis at the loading position.

6. The combination set forth in claim 3, wherein said good electrical conductor is a high conductivity material having a relatively high hardness, to effectively ground electric charges to reduce sticking of said magnetic medium resulting from said electric charges.

* * * * *